United States Patent
Suzuki et al.

(10) Patent No.: US 9,886,237 B2
(45) Date of Patent: Feb. 6, 2018

(54) TEXT-READING DEVICE AND TEXT-READING METHOD

(71) Applicant: DENSO CORPORATION, Kariya, Aichi-pref. (JP)

(72) Inventors: Kensuke Suzuki, Obu (JP); Yuji Shinkai, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/647,417

(22) PCT Filed: Oct. 2, 2013

(86) PCT No.: PCT/JP2013/005866
§ 371 (c)(1),
(2) Date: May 26, 2015

(87) PCT Pub. No.: WO2014/083738
PCT Pub. Date: Jun. 5, 2014

(65) Prior Publication Data
US 2015/0293745 A1    Oct. 15, 2015

(30) Foreign Application Priority Data

Nov. 27, 2012  (JP) .................. 2012-258497

(51) Int. Cl.
*G06F 3/16* (2006.01)
*G10L 13/04* (2013.01)
(Continued)

(52) U.S. Cl.
CPC ............. *G06F 3/167* (2013.01); *B60K 35/00* (2013.01); *B60K 37/06* (2013.01); *B60R 11/02* (2013.01);
(Continued)

(58) Field of Classification Search
CPC . G06F 3/03; G06F 3/017; G06F 3/011; G06F 3/041; G06F 3/013; G10L 13/00; G10L 13/02
(Continued)

(56) References Cited

U.S. PATENT DOCUMENTS

| | | | |
|---|---|---|---|
| 6,152,563 A * | 11/2000 | Hutchinson | A61B 3/113 351/209 |
| 2002/0075136 A1* | 6/2002 | Nakaji | B60K 35/00 340/425.5 |
| 2008/0122799 A1* | 5/2008 | Pryor | G06F 3/0312 345/173 |

FOREIGN PATENT DOCUMENTS

| | | |
|---|---|---|
| JP | H06321030 A | 11/1994 |
| JP | H09329458 A | 12/1997 |

(Continued)

OTHER PUBLICATIONS

International Search Report and Written Opinion (in Japanese with English Translation) for PCT/JP2013/005866, dated Dec. 24, 2013; ISA/JP.

*Primary Examiner* — Paras D Shah
*Assistant Examiner* — Yi-Sheng Wang
(74) *Attorney, Agent, or Firm* — Harness, Dickey & Pierce, P.L.C.

(57) ABSTRACT

A text-reading device includes: a visual line direction detection device for a driver; a memory that stores the visual line direction when the driver looks at a display device; a gaze determination device that determines that the driver gazes the display device when a state that the detected visual line direction coincides with the stored visual line direction continues for predetermined time or longer; a voice conversion device that outputs text information of the display device as a voice signal based on an instruction; and a reading control device that inputs the instruction when the (Continued)

driver gazes the display device while the display device displays the text information, and the vehicle starts to move.

11 Claims, 5 Drawing Sheets

(51) Int. Cl.
| | |
|---|---|
| *G10L 13/027* | (2013.01) |
| *G06F 3/01* | (2006.01) |
| *B60K 35/00* | (2006.01) |
| *B60K 37/06* | (2006.01) |
| *B60R 11/02* | (2006.01) |
| *G08G 1/16* | (2006.01) |
| *G06F 3/0346* | (2013.01) |
| *G08G 1/0962* | (2006.01) |
| *G10L 25/48* | (2013.01) |
| *G10L 13/08* | (2013.01) |

(52) U.S. Cl.
CPC ............ *G06F 3/013* (2013.01); *G06F 3/0346* (2013.01); *G06F 3/16* (2013.01); *G08G 1/0962* (2013.01); *G08G 1/16* (2013.01); *G10L 13/027* (2013.01); *G10L 13/04* (2013.01); *G10L 13/043* (2013.01); *G10L 25/48* (2013.01); *G10L 13/08* (2013.01)

(58) Field of Classification Search
USPC ...................................... 704/260; 345/633, 8
See application file for complete search history.

(56) References Cited

FOREIGN PATENT DOCUMENTS

| | | |
|---|---|---|
| JP | 2003114691 A | 4/2003 |
| JP | 2003177771 A | 6/2003 |
| JP | 2006098695 A | 4/2006 |
| JP | 2006293909 A | 10/2006 |

* cited by examiner

TEXT-READING DEVICE AND TEXT-READING METHOD

CROSS REFERENCE TO RELATED APPLICATIONS

This application is a U.S. National Phase Application under 35 U.S.C. 371 of International Application No. PCT/JP2013/005866 filed on Oct. 2, 2013 and published in Japanese as WO 2014/083738 A1 on Jun. 5, 2014. This application is based on and claims the benefit of priority from Japanese Patent Application No. 2012-258497 filed on Nov. 27, 2012. The entire disclosures of all of the above applications are incorporated herein by reference.

TECHNICAL FIELD

The present disclosure relates to a text-reading device and text reading method for reading text information aloud to a driver.

BACKGROUND ART

A car navigation device has a function for reading text-information (i.e., mail information, SNS (social networking service) information and the like) aloud to a driver using voice synthesis technique, in addition to a function for providing voice guidance of a route to a destination (see Patent Literature 1). The device sets a reading-aloud mode automatically in accordance with an input source of the text information or a content of the text information. Further, the device specifies a combination of voice synthesis control parameters corresponding to the reading-aloud mode, so that the device synthesizes a voice. According to the device, when a volume of the mail information is large, a reading-aloud speed becomes high, so that reading-aloud time is reduced. Further, when the device reads route guidance information and traffic information, the reading-aloud speed for a distance and a geographical name becomes low, so that a passenger can catch the sound.

The above device sets the reading-aloud mode according to the content of the text information or the input source (i.e., a type of an application program) of the text information. Accordingly, the device does not have a construction for reading aloud at a timing suitable for the driver with consideration to safety of the driver. Specifically, when the vehicle is in a stop condition so that the driver reads the text information by himself or herself, it is not always necessary to read aloud automatically. Instead, since the driver reads the text information by himself or herself, the automatic reading-aloud is very bothersome. When the vehicle is in a running condition so that the driver cannot read the text information, it is necessary to read aloud automatically because of the safety.

PRIOR ART LITERATURES

Patent Literature

Patent Literature 1: JP-2006-98695

SUMMARY OF INVENTION

It is an object of the present disclosure to provide a text-reading device and a text-reading method for reading text information aloud appropriately when a driver needs to read the text information.

According to a first aspect of the present disclosure, a text-reading device includes: a visual line direction detection device that detects a visual line direction of a driver of a vehicle; a memory that stores the visual line direction of the driver when the driver looks at a display screen of a display device, which is arranged in a compartment of the vehicle; a gaze determination device that determines that the driver gazes the display screen of the display device when a state that the visual line direction detected by the visual line direction detection device coincides with the visual line direction stored in the memory continues for predetermined gaze determination time or longer; a voice conversion device that converts text information as a display object of the display device to a voice signal when a read-starting instruction is input; and a reading control device that inputs the read-starting instruction into the voice conversion device when a read-starting condition is satisfied that the gaze determination device determines that the driver gazes the display screen of the display device while the display device displays the text information, and the vehicle starts to move.

In the above text-reading device, until the driver starts to drive the vehicle after the driver gets in the vehicle, while the driver stops the vehicle temporally because of a waiting at a traffic light, or so on, when the driver gazes the display screen of the display device, the gaze determination device determines that the driver is gazing. When the vehicle starts to run while the display device displays the text information, if the gaze determination device determines that the driver is gazing, a possibility may be high such that the driver starts to drive the vehicle while the driver is reading the text information. Thus, the device starts to read the text information as the display object aloud.

Thus, although the driver averts eyes from the display device in order to start to run the vehicle, the device provides the text information continuously with a voice. Further, a conventional system reads the text information aloud every time the application program is activated. Different from the conventional system, the device reads the text information aloud under a condition that it is necessary for the driver to read the text information aloud using the device in order to secure the safety.

According to a second aspect of the present disclosure, a text-reading method includes: detecting a visual line direction of a driver of a vehicle; storing the visual line direction of the driver when the driver looks at a display screen of a display device, which is arranged in a compartment of the vehicle; determining that the driver gazes the display screen of the display device when a state that a detected visual line direction coincides with a stored visual line direction continues for predetermined gaze determination time or longer; inputting a read-starting instruction when it is determined that the driver gazes the display screen of the display device while the display device displays the text information, and the vehicle starts to move; and converting the text information as a display object of the display device to a voice signal when the read-starting instruction is input, and outputting the voice signal.

The above method provides the text information continuously with voice to the driver, who averts eyes from the display device in order to start to run the vehicle. Further, a conventional system reads the text information aloud every time the application program is activated. Different from the conventional system, the method provides to read the text information aloud under a condition that it is necessary for the driver to read the text information aloud using the device in order to secure the safety.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
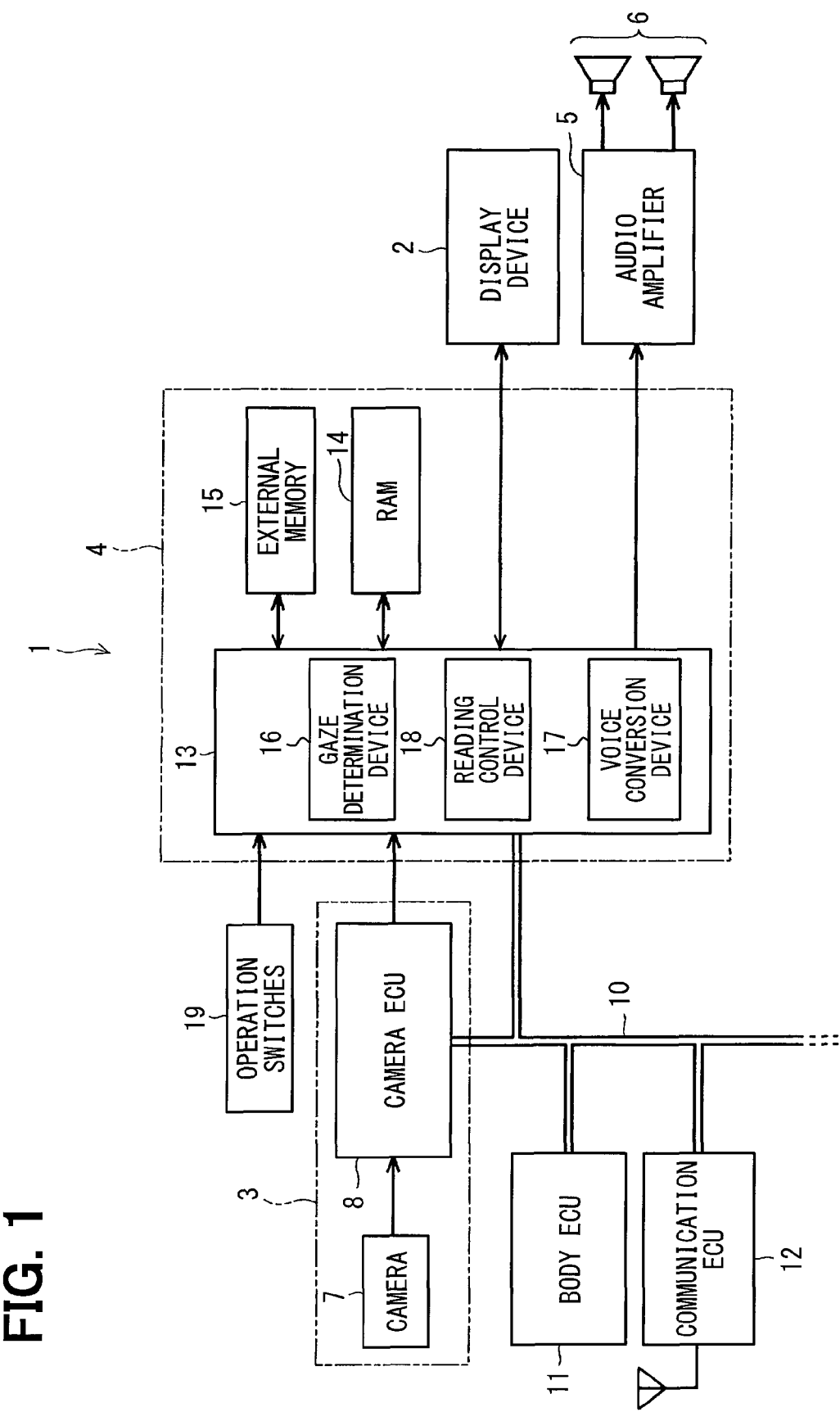
FIG. 1 is a diagram showing a system including a text-reading device according to a first embodiment.

A first embodiment of the present disclosure will be explained with reference to FIGS. 1 to 4. A text-reading device 1 shown in FIG. 1 is an apparatus for reading text information aloud on behalf of a driver when the driver cannot continue to read the text information, which is displayed on a display device 2, by himself or herself since the driver starts to drive a vehicle. The text-reading device 1 includes a visual line direction detection device 3 and a ECU (i.e., electronic control unit) as an in-vehicle device 4.

The display device 2 is arranged in space disposed at an intermediate position of a dashboard between a driver seat and a front passenger seat, for example. The display device 2 may be a stand-alone device. Alternatively, the display device may be assembled in a car navigation device. A display signal (i.e., an image signal, a text signal and the like) output from the in-vehicle device 4 is transmitted to the display device 2, and the display device 2 displays an image or a text. A voice signal output from the in-vehicle device 4 is output from a speaker 6 arranged in a compartment via an audio amplifier 5.

Figure 2:
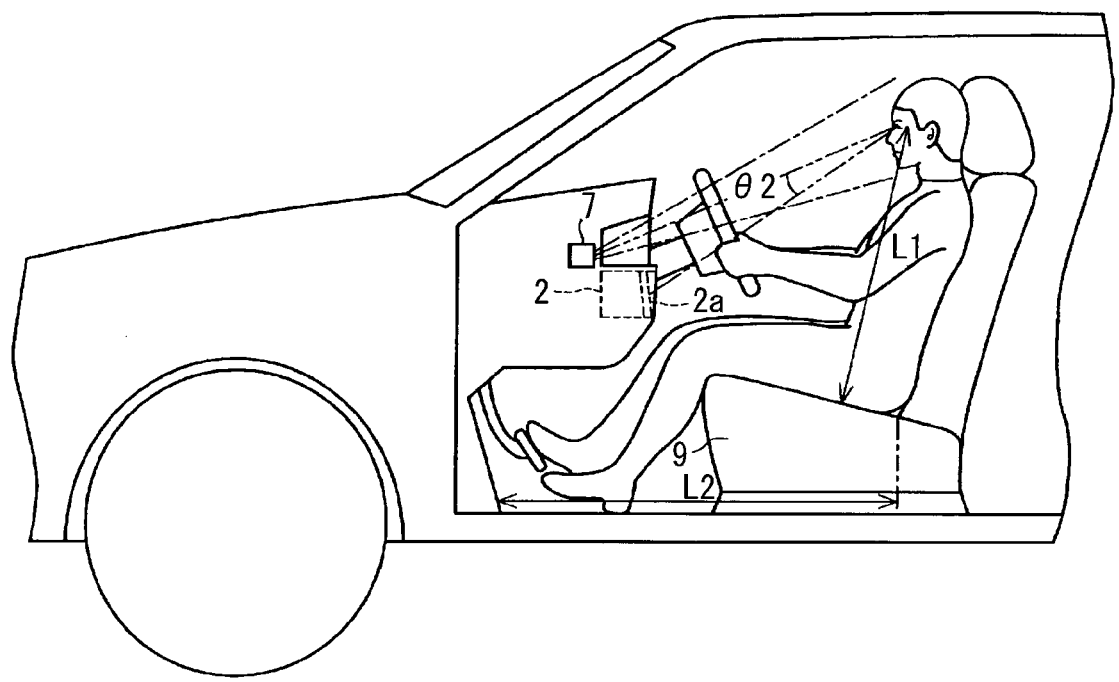
FIG. 2 is a diagram of explanation showing a shooting range of a camera for a face image and a visual line of the driver.

The visual line direction detection device 3 is a visual line direction detecting device for detecting a visual line direction of the driver. The device 3 includes a camera 7 and a camera ECU 8. The camera 7 is arranged at a position, from which the camera 7 shoots a face of a passenger (or the driver) sat on a driver seat 9, such as an instrument board of an instrument panel, as shown in FIG. 2. The camera 7 is a near infrared light camera, and therefore, the camera 7 can shoot a face image even at night. In this case, the camera 7 may irradiate near infrared light toward the face of the driver from an auxiliary light source, so that the camera 7 shoots the face image of the driver.

The camera ECU 8 detects the visual line direction of the driver based on the face image of the driver input from the camera 7. A visual line detection method may be provided by various methods. For example, a position of an apple of an eye is specified based on the face image. The visual line direction is specified from a relative distance between a pupil position and an inner corner position of the eye. Alternatively, the visual line direction may be detected from the face image using filter information (as a visual line detection model) connecting between the face image and the visual line direction. Alternatively, a horny coat reflection method may be used. The camera ECU 8 transmits an angle $\theta1$ in a right-left direction of the visual line and an angle $\theta2$ (i.e., an elevation angle or a depression angle) in an up-down direction of the visual line under a standard of a straight line connecting between the camera 7 and the apple of the eye, to the in-vehicle device 4 via an in-vehicle LAN 10 such as a CAN.

The in-vehicle LAN 10 is connected to various ECUs. A body ECU 11 transmits a setting position of the driver seat 9 in a front-rear direction to the in-vehicle device 4. A communication ECU 12 provides a connection to an Internet via a mobile communication network. Via this communication function, the in-vehicle device 4 and other in-vehicle ECUs can access a mail server and a web site. Further, they can utilize a SNS. The in-vehicle LAN 10 is connected to a device for outputting other display signals, a device for outputting a sound signal, an engine ECU for detecting a vehicle speed and the like.

The in-vehicle device 4 can execute an application program such as a mailer and a SNS by itself. The in-vehicle device 4 integrates and superimposes the text signal for displaying on the display device 2 and the display signal output from other in-vehicle ECUs by executing the application program. Then, the device 4 outputs the integrated signal to the display device 2. Further, an image data shot by various in-vehicle cameras such as the camera 7, the map drawing data, the video data reproduced from a DVD and the like are directly input into the in-vehicle device 4, and then, are output to the display device 2.

The in-vehicle device 4 includes a control unit 13, a RAM 14, an external memory 15 and the like. The control unit 13 includes a CPU, a ROM, a communication circuit, a timer, a I/O port, a D/A converter and the like. When the CPU executes a program stored in the external memory 15 or the ROM, the control unit 13 functions as a gaze determination device 16, a voice conversion device 17 and a reading control device 18. The in-vehicle device 4 outputs the display signal to the display device 2, and the operation signal is input into the device 4 when the display device 2 has a touch operation function. The operation signal can be input into the device 4 from an operation switch group 19. The voice signal is input into the audio amplifier 5 via a D/A converter.

The external memory 15 is a flash memory, a HDD, a SD memory card or the like. The external memory 15 stores a sitting height and body height data of a driver and a gaze determination data. The sitting height and body height data represents a sitting height or a body height of the driver. In the present embodiment, the sitting data is used. The gaze determination data represents a typical gaze direction (i.e., an angle $\theta1r$ in a right-left direction and an angle $\theta2r$ in an up-down direction) of the driver when the driver looks at a display screen 2a (around a center of the screen) of the display device 2 with respect to each combination of the seat height L1 of the driver and a setting position L2 of the driver seat 9 in the front-rear direction. In the following explanation, the gaze direction is defined as a display screen gaze direction.

Next, functions according to the present embodiment will be explained with reference to FIGS. 3 and 4. The control unit 13 starts to execute a program for setting a screen gaze flag shown in FIG. 3, which provides the gaze determination device 16, when an accessory switch of the vehicle turns on. When the accessory switch turns off, the program ends. Alternatively, instead of the turning on and off of the accessory switch, the program may start and end when an ignition switch turns on and off.

The control unit 13 activates a gaze monitoring process at step S1. In an initialize process, the unit 13 resets the screen gaze flag, and sets values of a screen gaze timer and a gaze release timer to be zero. The unit 13 reads out the sitting height and body height data of the driver from the external memory 15, and the setting position L2 of the driver seat 9 in the front-rear direction is input from the body ECU 11. Further, the display screen gaze direction (i.e., the angles θ1r, θ2r) corresponding to a combination of the sitting height L1 and the setting position L2 is read out from the external memory 15. At this time, the pupil position may be input from the camera ECU 8, and, when the pupil position is disposed outside of a standard range of the pupil, which is calculated based on the sitting height L1 and the setting position L2, a process for prompting the driver to input the sitting height and body height data may be added.

The gaze direction (i.e., the angles θ1, θ2) is input into the control unit 13 from the camera ECU 8 at step S2. When the gaze direction (i.e., the angles θ1, θ2) coincides with the display screen gaze direction (i.e., the angles θ1r, θ2r), the unit 13 determines that the driver looks at the display screen 2a (i.e., the screen) of the display device 2 (i.e., YES). Then, at step S3, the unit 13 activates the screen gaze timer. When the unit 13 determines that the driver does not look at the display screen 2a (i.e., NO), the unit 13 repeats the determination step at step S2 until the driver gazes. Here, the display screen gaze direction (i.e., the angles θ1r, θ2r) is a typical visual line direction when the driver looks at near the center of the display screen 2a. Thus, the display screen gaze direction is slightly different from a visual line direction when the driver looks at a corner of the display screen 2a. Accordingly, when the coincidence of the visual line direction is determined, if a deviation between the gaze direction and the display screen gaze direction is disposed within a range corresponding to the difference, the unit 13 considers as the coincidence.

The control unit 13 determines at step S4 according to a similar step as step S2 whether the driver looks at the display screen 2a after the screen gaze timer is activated. Here, when the unit 13 determines that the driver looks (i.e., YES), it goes to step S5. At step S5, the unit 13 determines whether the value of the screen gaze timer is equal to or larger than a gaze determination time Tset (such as 5 seconds). When the gaze determination time Tset has elapsed since the driver start to look at the display screen 2a, the unit 13 judges yes, and then, it goes to step S6. At step S6, the unit 13 sets the screen gaze flag stored in the RAM 14. When the gaze determination time Tset has not elapsed yet, the unit 13 judges no, and then, it returns to step S4.

The unit 13 repeatedly executes steps S4 and S5, so that the unit 13 stands by until the gaze determination time Tset has elapsed. While the unit 13 stands by, when the driver averts eyes from the display screen 2a of the display device 2, the unit 13 determines at step S4 that the driver does not look at the display screen 2a (i.e., NO). In this case, it goes to step S12. At step S12, the unit 13 interrupts the screen gaze timer, and then, resets the timer. After that, it returns to step S2. Thus, the control unit 13 sets the screen gaze flag showing that the driver gazes the display screen 2a of the display device 2 when the state that the visual line direction detected by the visual line direction detection device 3 coincides with the display screen gaze direction read out from the external memory 15 continues for the gaze determination time Tset or longer.

The control unit 13 activates the gaze release timer at step S7 after the screen gaze flag is set. The unit 13 determines at step S8 according to a similar step as step S2 whether the driver looks at the display screen 2a. Here, when the unit 13 determines that the driver looks at (i.e., YES), it goes to step S11. St step S11, the unit 13 resets the gaze release timer. On the other hand, when the unit 13 determines that the driver does not look at (i.e., NO), it goes to step S9. At step S9, the unit 13 determines whether the value of the gaze release timer is equal to or larger than the release determination time Tres (such as 2 seconds).

When the release determination time Tres has not elapsed since the driver averts eyes from the screen, the unit 13 judges no at step S9, and then, it returns to step S8. On the other hand, when the release determination time Tres has elapsed while the driver continues to avert eyes from the screen, the unit 13 judges yes at step S9, and then, it goes to step S10. At step S10, the unit 13 resets the screen gaze flag. After that, at step S12, the unit 13 performs a step for stopping and resetting the screen gaze timer, and then, it returns to step S2.

Thus, the control unit 13 determines that the driver does not look at the display screen 2a, and resets the screen gaze flag when a state that the driver does not look at the display screen 2a continues for the release determination time Tres or longer after the unit 13 determines that the driver is gazing the display screen 2a of the display device 2, and sets the screen gaze flag.

For example, when the driver stops the vehicle because of the waiting at a traffic light, and the driver continues to read a display content on the display screen 2a (i.e., a screen) for the gaze determination time Tset or longer, the unit 13 sets the screen gaze flag. In some cases, the driver may avert eyes from the display screen 2a temporally to confirm the switching of the traffic light. Even in this case, when the driver confirms a stop signal, the driver switches the gaze to the display screen 2a again for a short time shorter than the release determination time Tres (e.g., 2 seconds). In this case, the control unit 13 continues to set the screen gaze flag. On the other hand, after the driver continues to read the display content for the gaze determination time Tset or longer, and completes to read, the driver averts eyes from the display screen 2a. In this case, the driver does not return the gaze to the display screen 2a even after the release determination time Tres (e.g., 2 seconds) has elapsed. Thus, the control unit 13 resets the screen gaze flag.

When the in-vehicle device 4 executes an application program such as a mailer and a SNS, the device 4 displays text information such as a received mail content, a message content and character information on the display device 2. The in-vehicle device 4 integrates other text information with the text information to be provided and displayed by the device 4, and displays integrated information when the device 4 receives other text information such as traffic information written in letters from other ECUs.

Figure 4:
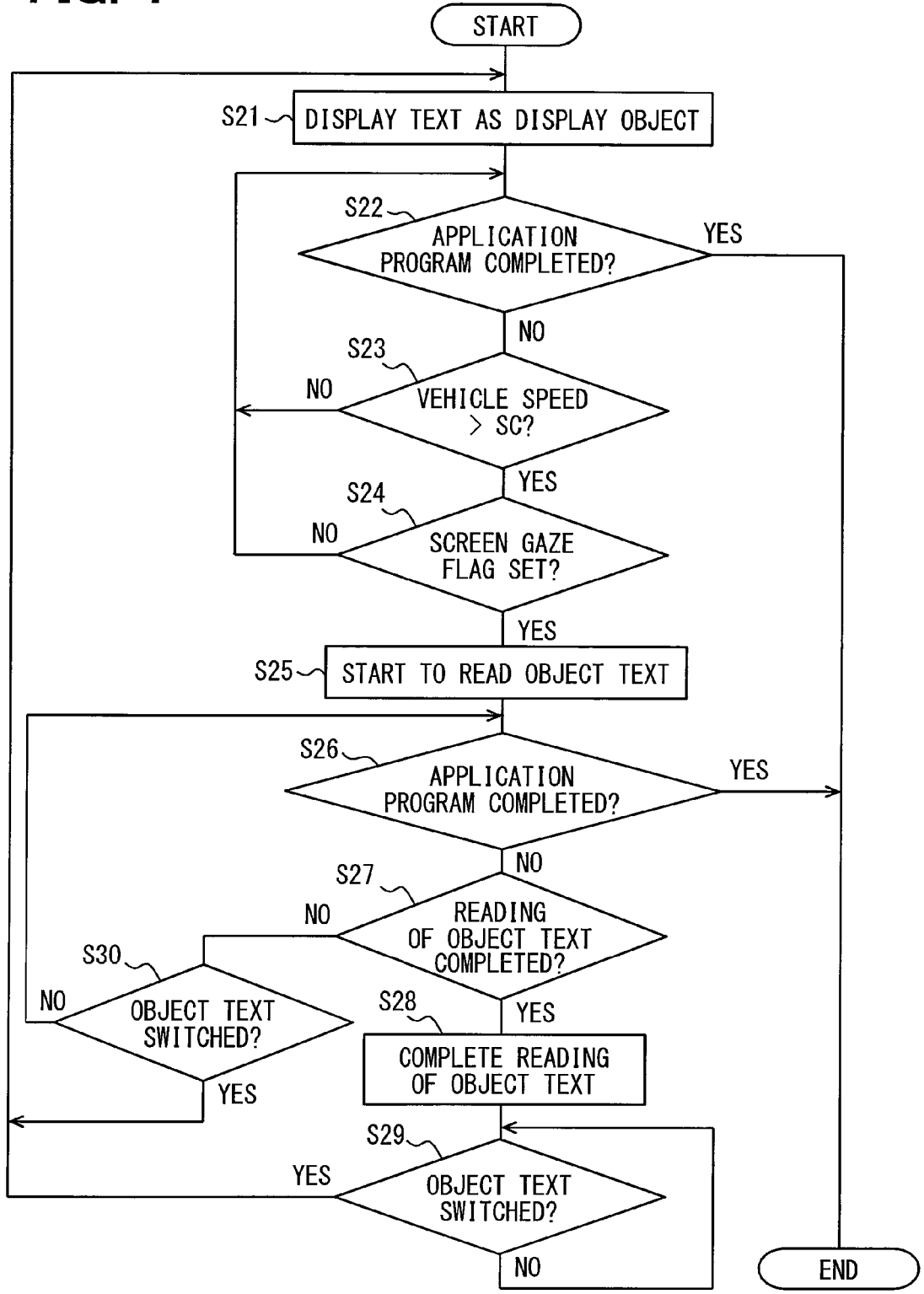
FIG. 4 is a flowchart showing a reading program.

The control unit 13 starts to execute a reading program shown in FIG. 4 as a voice conversion device 17 and a reading control device 18 when the device 13 starts to execute the application program for displaying the text information. In this program, the control unit 13 functioning as the voice conversion device 17 executes a step for converting the text information to a voice signal and outputting the voice signal. The control unit 13 functioning as the reading control device 18 executes other steps. The control unit 13 displays the text as a display object on the display screen 2a of the display device 2 at step S21. Here, the text as the display object represents not only the text to be displayed on one screen but also a whole of the text content as the display object.

The control unit 13 as the reading control device 18 determines at step S22 whether the execution of the application program is completed. When the execution is completed, the unit 13 determines yes, and ends the reading program. When the execution is not completed, the unit 13 determines no, and it goes to step SS23. At step S23, the unit 13 determines whether the vehicle starts to drive. This determination is performed by judging whether the vehicle speed is equal to or faster than a predetermined speed Sc. The predetermined speed Sc is set to a speed, at which it is not preferable on security grounds for the driver to drive the vehicle with looking at the display screen 2*a*, such as 5 km/h to 7 km/h. Alternatively, the predetermined speed Sc may be set to zero.

It returns to step S22, and the control unit 13 does not read the text because it is possible for the driver to read the displayed text by himself or herself when the control unit 13 determines at step S23 that the vehicle speed is equal to or smaller than the predetermined speed Sc (i.e., NO). On the other hand, when the unit 13 determines that the vehicle speed exceeds the predetermined speed Sc (i.e., YES), the unit 13 determines at step S24 whether the screen gaze flag is set. When the screen gaze flag is not set, it does not return to step S22, and the unit 13 does not read the text since the driver does not gaze the display screen 2*a* (i.e., the driver does not read the text)) before starting to drive the vehicle On the other hand, when the screen gaze flag is set, it goes to step S25. At step S25, the unit 13 starts to read the text as the display object. At this time, a process routine of the reading control device 18 gives an instruction for starting to read the text to the process routine of the voice conversion device 17. The control unit 13 as the voice conversion device 17 converts the text as the display object to the voice signal, and outputs the voice signal to the audio amplifier via the D/A converter. In this case, the unit 13 reads the text displayed on the display screen 2*a* aloud not to read redundantly the content which the driver has finished to read already. Further, if the unit 13 starts to read a middle of a sentence aloud, it is not natural. Thus, it is preferable to go back to and read aloud from a beginning of the sentence of the text displayed initially on the display screen 2*a*.

The control unit 13 determines at step S26 whether the execution of the application program is completed after the unit 13 starts to read aloud. When the program is completed, the unit 13 determines yes, and then, the unit 13 ends to execute the reading program. When the program is not completed, the unit 13 determines no, and the, it goes to step S27. At step S27, the unit 13 determines whether the reading of the display object text is completed (i.e., whether the reading of a whole of the text is completed).

When the reading is not completed, the unit 13 determines no, and then, it goes to step S30. At step S30, the unit 13 determines whether the display object text is switched. When the text is not switched, it returns to step S26. At step S26, the unit 13 continues to read the display object text. When the display object text is switched, it returns to step S21. At step S21, the unit 13 executes the reading step for a new text as a new display object.

On the other hand, when the unit 13 determines at step S27 that the reading is completed, the unit 13 ends to read the display object text at step S28. After that, it goes to step S29, and the unit 13 waits for the switching of the display object text. When the display object text is switched, it returns to step S21. At step S21, the unit 13 executes the reading step for a new text as a new display object.

As described above, the text-reading device 1 according to the present embodiment reads the display object text aloud when the vehicle starts to move while the display device 2 displays the text information under a condition that the driver is gazing the display screen 2*a* of the display device 2. The driver, who is reading a received mail or a message of a SNS while waiting at the traffic light or the like, remains to read a unread part since the traffic light is changed. When the unread part remains, and the driver starts to drive the vehicle, the device 1 provides the text content to the driver continuously with voice.

The device 1 does not read the text information aloud every time the application program is activated, but reads the information aloud only when it is difficult for the driver to read the display text safety since the vehicle starts to move while the driver is reading the text. Accordingly, it is prevented from unnecessary reading aloud for the driver.

The text-reading device 1 determines that the driver is gazing the display screen 2*a* when the driver continues to looking at the display screen 2*a* of the display device 2 for the gaze determination time Tset or longer. When the gaze determination time Tset is set to be appropriate time (such as 5 seconds in the present embodiment), the device 1 can determine properly whether the driver reads the text displayed on the screen. Further, when the driver continuously averts eyes from the display screen 2*a* for the release determination time Tres or longer after the device 1 determines that the driver is gazing, the device 1 determines that the driver does not gaze the display screen 2*a*. When the release determination time Tres is set to be appropriate time (such as 2 seconds in the present embodiment), the device 1 can determine properly whether the driver completes to read the text displayed on the screen.

The text-reading device 1 does not read redundantly a content, which has been already read by the driver. Therefore, the driver can obtain the text information effectively for a short time. Further, since the device 1 starts to read from a separation of the text (i.e., the beginning of the sentence), the content at a starting part of the reading aloud is easily understandable.

Second Embodiment

Figure 5:
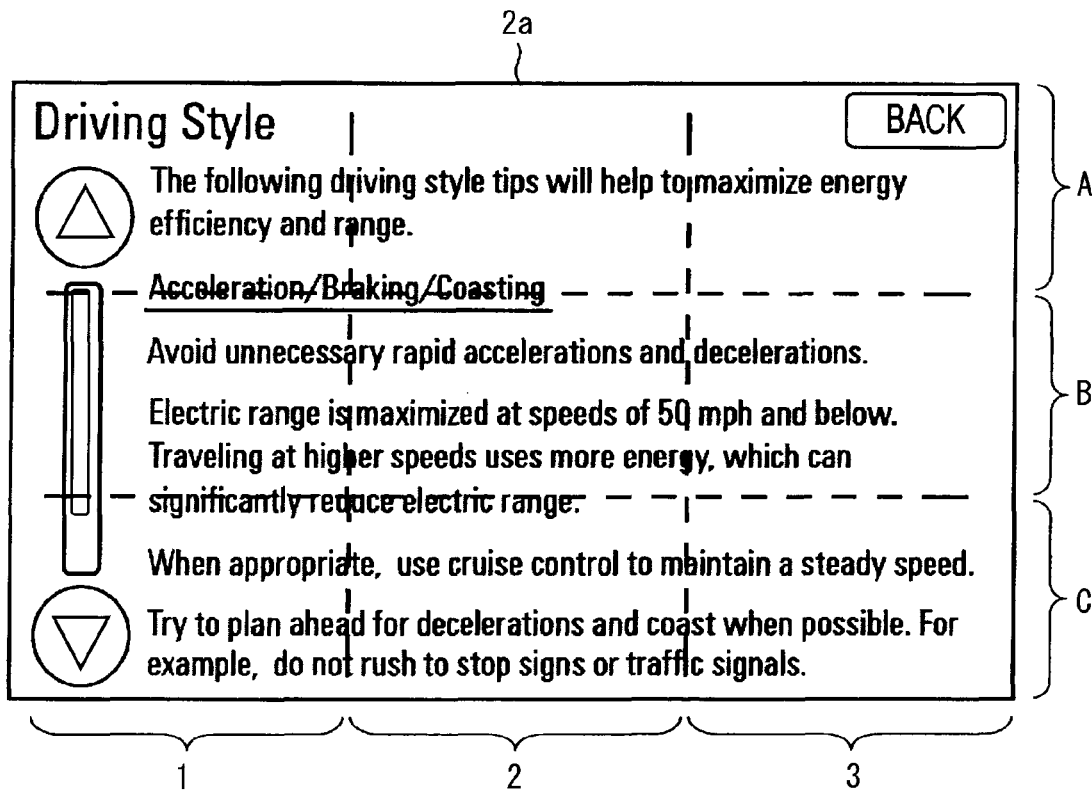
FIG. 5 is a diagram showing a display screen according to a second embodiment.

Next, a second embodiment will be explained with reference to FIG. 5. The display screen 2*a* of the display device 2 is divided into multiple regions, as shown in FIG. 5. Here, the vertical direction of the display screen 2*a* is divided into three regions A, B and C. The horizontal direction of the display screen 2*a* is divided into three regions 1, 2 and 3. As a result, the display screen 2*a* is divided into nine regions A1, A2, A3, B1, B2, B3, C1, C2, and C3. A broken line shown in the drawing is a boundary added for explanation. Thus, the broken line is not actually displayed.

The gaze determination data stored in the external memory 15 (refer to FIG. 1) is data connecting the ordinary visual line direction of the driver with each region A1 to C3 with respect to each combination of the sitting height L1 (or the body height) of the driver and the setting position L2 of the driver seat in the front-rear direction when the driver looks at each region A1 to C3 of the display screen 2*a* of the display device 2. In the following explanation, the visual line direction is defined as a regional visual line direction.

Figure 3:
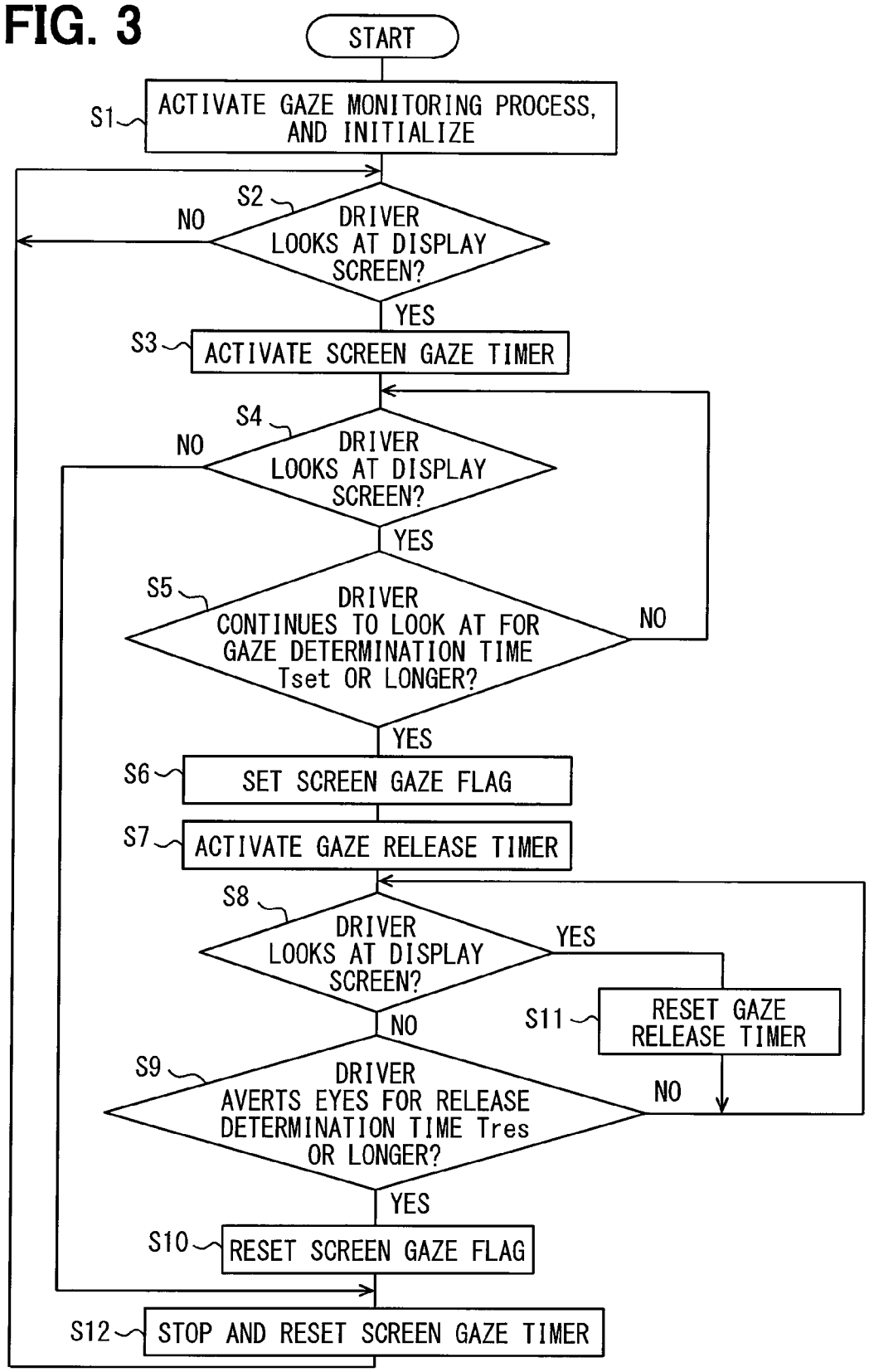
FIG. 3 is a flowchart of an image gazing flag setting program.

The control unit 13 determines at steps S2 and S4 in the screen gaze flag setting program shown in FIG. 3 whether the driver looks at the display screen 2*a* (i.e., one of the regions A1 to C3). Here, the control unit 13 specifies the region of the display screen 2*a*, which the driver is looking at, based on the visual line direction detected by the visual line direction detection device 3 and the regional visual line direction of each region, and stores the region in the RAM 14 when the unit 13 sets the screen gaze flag at step S6, and when the unit 13 determines at step S8 whether the driver looks at the display screen 2a. The specified region is a last region, which the driver gazes just before the driver averts eyes from the display screen 2a.

In the reading program shown FIG. 4, the control unit 13 reads out the region stored in the RAM 14 when a condition for starting to read the display object text aloud is satisfied (i.e., YES at step S24). Then, the unit 13 starts to read aloud from the text shown in the region (at step S25). In this case, if the unit 13 starts to read a middle of a sentence aloud, it is not natural. Thus, it is preferable to go back to and read aloud from a beginning of the sentence of the text displayed initially in the region. For example, when the gaze region in FIG. 5 is the region B2, the unit 13 goes back to the term "avoid" in the region B1 as the beginning of the sentence of the text displayed initially in the region B2, and starts to read from the term.

In the text-reading device 1 according to the present embodiment, an overlapping part when reading aloud is much reduced since the display screen 2a is divided into multiple regions so that the visual line direction of the driver is specified much finely. A similar function and similar effect as the first embodiment are obtained.

Other Embodiments

In the screen gaze flag setting program shown in FIG. 3, steps S7 to S9 and S11 may be skipped. In this case, for example, when a predetermined time interval has elapsed since the text is displayed on the display screen 2a, the screen gaze flag may be reset at step S10.

The gaze determination data and the sitting height and body height data of the driver may be stored in the inner memory (i.e., a storing device) of the control unit 13. Alternatively, the driver may input the sitting height and body height data instead of storing the sitting height and body height data. The in-vehicle device 4 may detect the visual line direction when the driver is looking at the display screen 2a of the display device 2 or each region A1 to C3 of the display screen 2a. Further, the device 4 may store the detected visual line direction as the typical display screen visual line direction or the typical regional visual line direction.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What it claimed is:

1. A text-reading device comprising:
    a visual line direction detection device that detects a visual line direction of a driver of a vehicle;
    a memory that stores the visual line direction of the driver when the driver looks at a display screen of a display device, which is arranged in a compartment of the vehicle;
    a gaze determination device that determines that the driver gazes at the display screen of the display device when a state that the visual line direction detected by the visual line direction detection device coincides with the visual line direction stored in the memory continues for a predetermined gaze determination time or longer;
    a voice conversion device that converts text information as a display object of the display device to a voice signal when a read-starting instruction is input; and
    a reading control device that inputs the read-starting instruction into the voice conversion device when a read-starting condition is satisfied that the gaze determination device determines that the driver gazes at the display screen of the display device while the display device displays the text information, and the vehicle starts to move;
    wherein the voice conversion device starts to read the text information when a vehicle speed is changed from zero to a speed equal to or faster than a predetermined speed, and the driver averts eyes from the display device to start to run the vehicle after the gaze determination device determines that the driver gazes at the display screen while the driver stops the vehicle.

2. The text-reading device according to claim 1, wherein the gaze determination device determines that the driver does not gaze at the display screen of the display device when a state that the visual line direction detected by the visual line direction detection device does not coincide with the visual line direction stored in the memory continues for a predetermined release determination time or longer after the gaze determination device determines that the driver gazes at the display screen of the display device.

3. The text-reading device according to claim 1, wherein the display screen of the display device is divided into a plurality of regions,
    wherein the memory stores the visual line direction of the driver in association with each region when the driver looks at each divided region, and
    wherein the reading control device inputs the read-starting instruction into the voice conversion device when the read-starting condition is satisfied, the read-starting instruction being for reading the text information from a text part displayed in one of regions of the display screen of the display device, the one of regions at which the driver finally gazes.

4. The text-reading device according to claim 3, wherein the reading control device inputs the read-starting instruction for reading the text information from a beginning of a text sentence initially displayed in one of the regions of the display screen, the one of the regions at which the driver finally gazes.

5. The text-reading device according to claim 1, wherein the reading control device inputs the read-starting instruction into the voice conversion device when the read-starting condition is satisfied, the read-starting instruction being for reading the text information from a beginning of a text sentence, which is initially displayed on the display screen of the display device.

6. The text-reading device recited by claim 1, wherein the voice conversion device starts to read the text information that is displayed on the display screen of the display device.

7. The text-reading device recited by claim 1, wherein the voice conversion device starts to read the text information from a beginning of a sentence of the text information that is displayed on the display screen of the display device.

8. A text-reading method comprising:
    detecting a visual line direction of a driver of a vehicle;
    storing the visual line direction of the driver when the driver looks at a display screen of a display device, which is arranged in a compartment of the vehicle;
    determining that the driver gazes at the display screen of the display device when a state that a detected visual line direction coincides with a stored visual line direction continues for a predetermined gaze determination time or longer;

inputting a read-starting instruction when it is determined that the driver gazes at the display screen of the display device while the display device displays the text information, and the vehicle starts to move;

converting the text information as a display object of the display device to a voice signal when the read-starting instruction is input, and outputting the voice signal; and starting to read the text information when a vehicle speed is changed from zero to a speed equal to or faster than a predetermined speed, and the driver averts eyes from the display device to start to run the vehicle after the determining that the driver gazes at the display screen while the driver stops the vehicle.

9. The text-reading method recited by claim 8, wherein starting to read the text information includes starting to read the text information that is displayed on the displace screen of the display device.

10. The text-reading method recited by claim 8, wherein starting to read the text information includes starting to read the text information from a beginning of a sentence of the text information that is displayed on the display screen of the display device.

11. A text-reading device comprising:

a visual line direction detection device that detects a visual line direction of a driver of a vehicle;

an engine electronic control unit that detects a vehicle speed of the vehicle;

a memory that stores the visual line direction of the driver when the driver looks at a display screen of a display device arranged in a compartment of the vehicle; and a control unit configured to:

determine that the driver gazes at the display screen of the display device in response to the visual line direction detected by the visual line direction detection device coinciding with the visual line direction stored in the memory for more than a predetermined gaze determination time period; and start converting text information of a display object of the display device to a voice signal in response to (i) determining that the vehicle speed detected by the engine electronic control unit changed from zero to a speed greater than a predetermined speed; and (ii) determining that the driver gazed at the display screen while the vehicle was stopped.

* * * * *